United States Patent

[11] 3,584,516

| [72] | Inventor | John S. Burpulis<br>Wilmington, Del. |
|---|---|---|
| [21] | Appl. No. | 800,994 |
| [22] | Filed | Feb. 20, 1969 |
| [45] | Patented | June 15, 1971 |
| [73] | Assignee | E. I. du Pont de Nemours and Company<br>Wilmington, Del. |

[54] ENDLESS BELTS REINFORCED WITH BRAIDED STRANDS
10 Claims, 4 Drawing Figs.

| [52] | U.S. Cl. | 74/233 |
|---|---|---|
| [51] | Int. Cl. | F16g 5/16 |
| [50] | Field of Search | 74/232, 233, 234 |

[56] References Cited
UNITED STATES PATENTS

| 1,923,542 | 8/1933 | Keyes | 74/234 UX |
|---|---|---|---|
| 2,257,648 | 9/1941 | Pierce | 74/233 UX |
| 2,442,037 | 5/1948 | Carter | 74/233 |
| 2,526,324 | 10/1950 | Bloomfield | 74/232 |
| 2,554,917 | 5/1951 | Moon | 74/233 |
| 2,690,985 | 10/1954 | Poole | 74/233 |
| 2,726,976 | 12/1955 | Waugh | 74/233 |
| 3,051,212 | 8/1962 | Daniels | 74/233 X |
| 3,179,241 | 4/1965 | Kain | 74/232 |

*Primary Examiner*—Leonard H. Gerin
*Attorney*—Louis Del Vecchio

ABSTRACT: An endless belt consisting essentially of a braided strand embedded in and adhered to an elastomeric polymer. The invention is particularly useful in manufacturing raw edge V-belts.

PATENTED JUN 15 1971 3,584,516

TAPE CONSTRUCTION

CORD CONSTRUCTION

INVENTOR
JOHN S. BURPULIS

BY *Louis D. Vecchio*

ATTORNEY

ENDLESS BELTS REINFORCED WITH BRAIDED STRANDS

FIELD OF INVENTION

This invention relates to the art of manufacturing elastomeric endless belts.

PRIOR ART

The art of manufacturing endless belts for industrial purposes has advanced to a point where high quality, long wearing belts can be manufactured economically. Large scale manufacture of industrial belts has led to increased use and increased demands on their capabilities. These belts are typically used to transmit power. One belt of particular interest is commonly referred to as a V-belt because of its trapezoidal cross section. An example of the industrial application of a V-belt is the fan belt of an automobile.

V-belts, described in terms of internally applied forces during use, comprise an inner compression section, an outer tension section, and an intermediate neutral axis. It is believed that the neutral axis carries most of the applied load during use. Accordingly, cords of natural or synthetic fibers are usually embedded in cushioning layers and placed along the neutral axis to reinforce the belt. These cords, being strong load-bearing members, permit a belt design having a low cross-sectional area. Although the design of V-belts is highly developed, one problem that still exists is "cord pop-out" which results in a significantly increased rate of deterioration of the belt during subsequent use.

In the manufacture of raw edged V-belts, a sleeve is formed and each belt is cut from the sleeve. A cord or some portion thereof is always exposed along the cut portion. In use, the exposed cord is subjected to rapid vibration, flexing, and heat aging and abrades against the pulley causing the cord to ravel or "pop-out." This condition is aggravated with continuous use until protruding fibers are stripped from the cord. With time a significant amount of cord is removed resulting in a loss of strength and deterioration of the belt.

The following illustrate some of the advances in manufacturing raw edged V-belts in an attempt to eliminate the problem of cord pop-out. U.S. Pat. No. 2,522,722 incorporates into the load carrying section a sheet made of rubberlike liquid agglutinant having disposed therein parallel and abutting filaments bonded together during prefabrication of the sheet. The filament have zero twist. U.S. Pat. No. 3,200,662 discloses a process of fusing exposed fibers to the adjoining portions of the belt. U.S. Pat. No. 2,773,540 discloses a method of making V-belts where the tension and the neutral axis incorporates a concentrically wound helix of continuous inextensible strength cord. U.S. Pat. No. 3,188,254 discloses the use of an adhesive coating on the reinforcing cords. In spite of these prior advances in the art of making raw edged belts, the problem of cord pop-out still exists.

SUMMARY OF THE INVENTION

In accordance with this invention there is provided an endless belt consisting essentially of an elastomeric material having embedded therein a braided strand adhered to the elastomeric polymer.

DESCRIPTION OF THE DRAWINGS

FIG. 4 also shows a cutaway section wherein the individual braided cords are exposed.

DETAILS OF THE INVENTION

Figure 1:
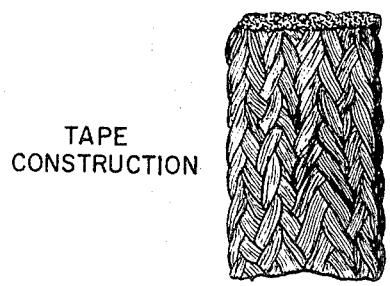
FIG. 1 is a perspective view of a braided strand constructed as a tape or ribbonlike member.
Figure 2:
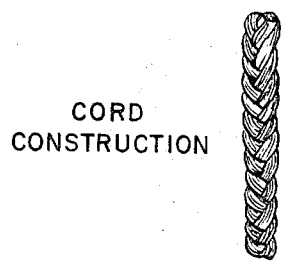
FIG. 2 is a perspective view of a braided strand constructed as a cord or ropelike member.

The improvement provided by this invention is the use of a braided strand as reinforcement in the manufacture of elastomeric belts and in particular V-belts. The braided strand is adhered to the enveloping elastomeric polymer by a suitable adhesive. This strand is generally used along the neutral axis section, however, braided strands can be used elsewhere in the belt such as in the tension section, in the compression section or in both. Furthermore, they can be used in a plurality of parallel disposed bonded strands as disclosed in U.S. Pat. No. 2,522,722.

The phrase "braided strand" means a cord, ribbon, tube yarn or other filamentary bundle having three or more component strands interwoven to cross each other forming a regular diagonal pattern down its length with the well known characteristic appearance of braided hair. Component strands of the braid can themselves have a braided construction, an interlaced construction, a twisted construction, or any strand construction that lends itself to being formed into a "braided strand."

A braided strand useful in this invention can be made from any suitable natural or synthetic fibers and filaments of suitable strength including: fibers made from a polyester such as polyethylene terephthalate, etc.; rayon; a synthetic linear polyamide such as a polyhexamethylene adipamide, polycaproamide, a copolymer of meta-phenylenediamine and isophthaloyl chloride, etc.; acrylic polymers such as homopolymers and copolymers of acrylonitriles; cotton; fiber glass or wire.

The standard braid pattern can be used to form a cord or tube. The standard braid pattern is made by passing each strand alternately under and over two strands to form an "under two over two" braid. Another usable braid pattern is the Diamond Braid or Basket Braid made by passing each strand alternately under and over one strand to form an "under one over one" braid. A solid cord braid is in the form of a lock stitched wrapping and during manufacture it is pulled through a die which holds the cord centrally against the pull of a carrier ensuring an even, solid circular cord. A braided strand in tubular form can have as a center core a strength member such as wire or fiberglass.

Flat or ribbonlike braids are made in the same general manner as cord or tubular braids except that the braiding process reverses direction at two given points called terminals forming a tubular braid with a slit in it permitting the tube to collapse and separate at the slit to lay flat as a tape or ribbon.

The size of the braid is largely governed by (a) the number of strands, (b) the denier of each strand, (c) the number of stitches per unit length, (d) the types of warps if any (warps are continuous lengths of material, which may or not be the same as the main braid, placed in the braid and running longitudinally through the braid without interlocking like the braid itself) and (e) the type and size of core inserted in the tubular braid, if a tubular braid is used.

Various useful types of braid patterns and methods of making them are well known to those skilled in the art of braiding.

The braided strand is treated before use in this invention by coating it with an adhesive. An isocyanate coating followed by a coating of a phenol-aldehyde resin such as resorcinol-formaldehyde provides excellent adhesion between the braided strand and the surrounding elastomer. The braided strand can also be heat-stretched so that the belt undergoes a minimum of tension decay or elongation during use. Tension decay or stretching during use causes the belt to slip resulting in the generation of excessive heat and premature failure of the belt.

Preparatory to making a belt, braided strand can be coated with adhesive by first passing it through a solvent solution of an organic isocyanate of methylene bis(4-phenylisocyanate) in monochlorobenzene. The volatile solvent is removed in a dryer at a temperature of 200° F. and a resident time of 90 seconds followed by heat treatment at 320°—345° F. for 90 seconds. Next the braided strand is passed through a resorcinol-formaldehyde solution made from the following ingredients: 5.5 parts resorcinol; 2,98 parts formaldehyde (37 percent); and 74.5 parts of a latex of a copolymer of vinyl pyridine, butadiene and styrene, where all parts are on a weight basis. The solution is then diluted with water to 25 percent solid. The resulting coated braided strand is heat treated in an oven at 470—475° F. with a residence time of 90 seconds while it is being stretched approximately 5 percent of its original length.

In a typical process of manufacturing V-belts of this invention a belt sleeve is built up in layers by wrapping the following materials around a hollow forming cylinder in the order given: (a) friction jacket, (b) compression elastomer, (c) cushion elastomer, (d) a braided strand helically wound, (e) cushion elastomer, and (f) three layers of friction jacket. An outer sleeve of butyl rubber is placed over the friction jacket and the complete assembly cured in an autoclave. The individual belts are obtained by cutting the sleeve on the cylinder in a manner to form endless belts with trapezoidal cross sections. Cutting after vulcanization is preferred because the vulcanized rubber and textile material will be firmer under the pressure of the knife.

Figure 3:
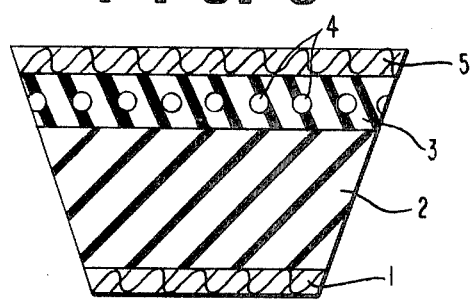
FIG. 3 is a cross-sectional view of a raw edged V-belt.

FIG. 3 is a cross-sectional view of a V-belt of the invention showing a rubberized textile fabric as the bottom (inner) layer 1, a compression section of elastomeric material 2, a cushion layer of elastomer 3 surrounding the reinforcing braided strand 4 and a cover layer of rubberized fabric 5. The rubberized fabric 5 comprises the tension section.

Figure 4:
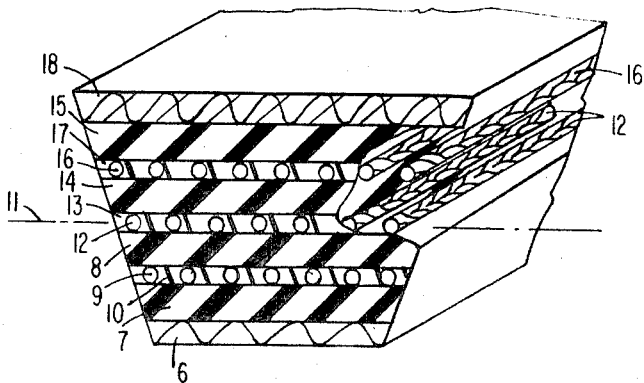
FIG. 4 is a perspective view of a raw-edged V-belt having braided strands in the tension section, the compression section, and along the neutral axis.

FIG. 4 is a perspective view of a V-belt showing a rubberized textile fabric 6 as the bottom layer, compression sections of elastomer 7 and 8 having imbedded therein braided strands 9 surrounded by a cushion layer of elastomer 10, a neutral axis indicated by line 11 having braided strands 12 imbedded along the neutral axis surrounded by a cushion layer of elastomer 13, tension sections of rubber 14 and 15 having imbedded therein braided strands 16 surrounded by a cushion layer of elastomer 17 and a cover layer of rubberized fabric 18. The cutaway section of FIG. 4 is included to show that each individual strand is braided.

The inner and outer surfaces of the belt sleeve can be a rubberized fabric cover called a friction jacket. The rubberized fabric can be wrapped around the cylinder forming a firm base on which to build up the belt body. The outer covering in the tension section may be a single layer used as a protective cover or it may be multiple layers built up to form the tension section itself. It must have tack for adequate fabricating properties and be resistant to heat hardening at operating temperature. Cotton impregnated with G-type neoprene can be used as a friction jacket. G-type neoprenes, well known to the art, are discussed in "Rubber Technology" by M. Morton, Chapter 13, Reinhold Publishing Corp. New York (1959).

The compression elastomer supports the braided strand in a uniform plane so that equal strain is placed in the braided strand during belt operation. The compression elastomer must be flexible in the direction of belt travel and rigid in the direction transverse to the belt travel. As an aid to making an elastomer rigid in the direction transverse to belt travel, short lengths of fibers can be dispersed in the compression elastomer. The fibers should be present in the amount of 10—35 parts per 100 parts of elastomer, can be up to one-half inch in length, and in the finished belt are preferably aligned in the direction transverse to belt travel. G-type neoprene is usable as compression elastomer.

Cushion layers of elastomer can be used to provide sufficient rubber in the vicinity of the braided strand to flow upon vulcanization of the belt so as to completely surround the braided strand in rubber. This helps to keep the braided strand properly aligned so that each braided strand carries its share of the load and prevents the braided strand from chafing against itself ultimately leading toward belt failure. The use of cushion elastomer is not always desirable and some methods of making V-belts eliminate its use.

The type elastomers that can be used to make the belts of this invention are: neoprenes, particularly the G-type neoprenes since they have good flexibility, heat aging and crystallization resistance, natural rubber, SBR (styrene /butadiene rubber), EP (ethylene/propylene) dipolymers and EPDM (ethylene/propylene/diene) terpolymers, such as those of ethylene/propylene/1,4-hexadiene, ethylene/propylene/ethylidene norbornene, ethylene/propylene/dicyclopentadiene and the like. Conventional methods of compounding and curing these elastomers can be used.

Detailed information related to apparatus and methods of manufacturing V-belts is disclosed in U.S. Pats. No. 3,188,254; No. 2,773,540; and No. 1,591,303.

Although in a preferred embodiment of the invention a braided strand is utilized in a raw-edged V-belt, the use of a braided strand as reinforcement can be extended to other type belts, such as wrapped belts (raw edged V-belts wrapped with friction jackets) and conveyor belts.

A braided strand coated with an isocyanate-phenolaldehyde resin offers the following advantages when used in belt construction: Inherent in the braided strand is the interlocking between the fibers themselves. This minimizes cord pop-out and the rate at which cord pop-out progresses. The use of a braided strand results in a smooth, quiet operating belt with less hysteresis to cause heat buildup and consequently lower operating temperature. This helps to increase the life of the belt.

This invention is illustrated by the following examples.

EXAMPLES 1—4

Raw-edged V-belts are constructed in the following conventional manner. A belt sleeve is built up in layers by wrapping the following materials around a hollow forming cylinder in the order given: (a) friction 0.023 inch thick, (b) uncured compression elastomer G-type neoprene, 0.190 inch thick, (c) uncured layer of cushion elastomer of G-type neoprene, 0.028 inch thick, (d) braided strands 11,000 denier helically wound around the sleeve approximately 0.050 inch thick, (e) uncured layer of cushion elastomer of G-type neoprene, 0.015 inch thick, and (f) three layers of friction jacket, 0.069 inch thick. The total thickness of the raw material on the sleeve is about 0.375 inch thick. An outer sleeve of butyl rubber is placed over the friction jacket as a processing aid and the complete assembly placed in an autoclave for curing.

The trapezoidal cross section of a finished belt has approximately the following dimensions: the long outer parallel side is 0.422 inch, the short inner parallel side is 0.203 inch, the length between the parallel sides is 0.313 inch and the angle included between the converging sides is 38°. The outer circumference of the belt is 42 inches.

All of the belts are built in the same manner except that the type construction of the braided strand is varied. All braided strands used have an overall denier of 11,000, are made of poly(ethylene terephthalate) continuous fibers and are treated in the following manner. The strand is dipped in a solution of an organic isocyanate of methylene (bis(4-phenylisocyanate) in monochlorobenzene. The volatile solvents are removed in a drying oven at approximately 200° F., then the strand is heat treated at a temperature in the range of 325° to 340° F. The strand is then coated with a solution of resorcinol formaldehyde followed by a heat treatment at temperatures in the range of 470°—475° F. During this heat treatment the strand is stretched approximately 5 percent of its original length. Residence time in the dryer and heat treatment compartments is approximately 90 seconds each.

Six belts of each type shown in table I are tested under dead-weight test conditions to determine the average life, average operating temperature and the average time for cord pop-out to occur. The dead-weight test comprises running a belt over two V-grooved pulleys. One pulley (driver) is fixed and driven by a power source at 3,500 ±100 r.p.m. The second pulley (driven) floats with the belt to maintain a constant tension by taking up any elongation occuring during operation and applying a constant dead-weight load of 160 lbs. All belts are tested until they fail, i.e. break or become so frayed that they are inoperable.

Sample A is a commercial V-belt incorporating a twisted cord construction along the neutral axis. It is not a part of the present invention but is used for comparison purposes. Following in table I are results of the dead-weight test.

TABLE I

| Ex. No. | Cord or tape description | Life [3] (hrs. to failure) | Operating temp.[3] (° F.) | Life to 1st indication of cord pop-out [3] |
|---|---|---|---|---|
| A | Twisted Cord [1] (1100×2×5 construction) | 182 | 185 | 111. |
| 1 | Braided Tape [2] (440×25-"tight" construction) [3] | 490 | 160 | 442. |
| 2 | Braided Cord [2] (1100×10-"loose" construction) | 209 | 180 | No cord pop-out. |
| 3 | Braided Cord [2] (1100×10-"tight" construction) | 242 | 175 | 218. |
| 4 | Braided Cord [2] (440×25-"tight" construction) | 330 | 170 | No cord pop-out. |

[1] Twisted cord— The first number 1,100 designates the denier of a strand. The second number 2 means that two strands are twisted together. The third number 5 means that 5 of the double strands are then twisted together in the opposite direction. This provides a cord having an overall denier of 11,000.

The particular twist used in the double strands is 1 twist every 5.2 inches of length. The twist used in the five double strand opposite twist is two twists per inch.

[2] Braided cord — The first number 400 or 1,100 denotes the denier of each strand and the second number 10 or 25 denotes the number of strands braided. In each example the overall cord denier is 11,000.

The terms "loose" and "tight" cord construction are relative terms signifying that in the tight construction an effort is made to draw the interlocking strands close together while in the loose construction the braiding is formed but the strands are left slack.

[3] Average of six belts.

What I claim is

1. In an endless belt consisting essentially of an elastomeric material having embedded therein a strand adhered to the elastomeric material, the improvement wherein the strand is braided, said strand having three or more component strands interwoven to cross each other forming a regular diagonal pattern.

2. The product of claim 1 in which the braided strand is in the form of a ribbon.

3. The product of claim 1 in which the braided strand is in the form of a cord.

4. The product of claim 1 in which the braided strand is made from continuous polyester fibers.

5. In a V-belt comprised of (a) a compression section, (b) a neutral axis section having an adhesive coated strand embedded therein, and (c) a tension section the improvement wherein the strand is braided said braided strand having three or more component strands interwoven to cross each other forming a regular diagonal pattern.

6. The product of claim 5 in which a braided strand is embedded in the compression section.

7. The product of claim 5 in which a braided strand is embedded in the tension section.

8. The product of claim 5 in which the braided strand is in the form of a tape.

9. The product of claim 5 in which the braided strand is in the form of a cord.

10. The product of claim 5 in which the braided strand is made from continuous polyester fibers.